Jan. 5, 1965  W. TURNER  3,163,919
ROTARY CUTTING TOOLS
Filed April 2, 1963
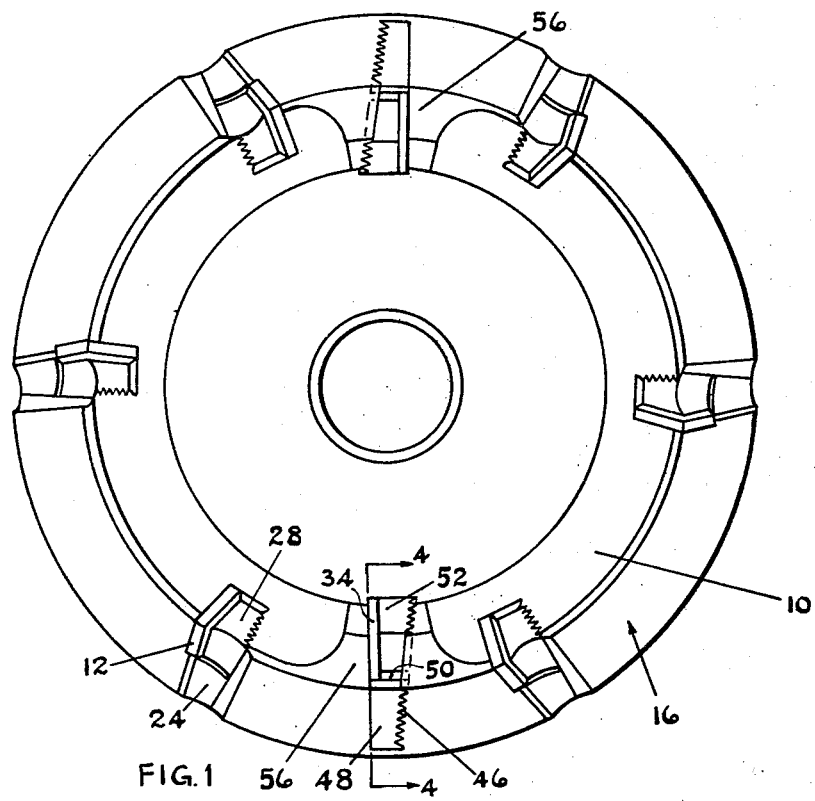
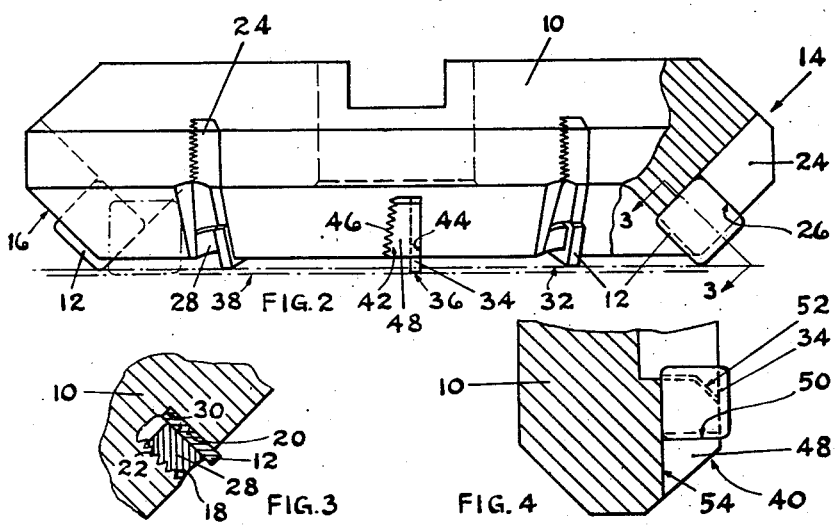
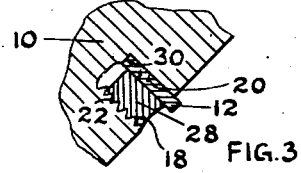
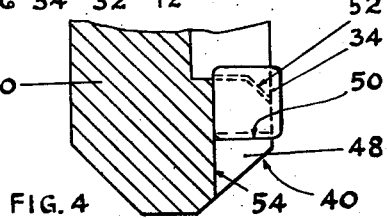
Inventor:
WILLIAM TURNER
By: McGlew and Toren
Attorneys United States Patent Office 3,163,919
Patented Jan. 5, 1965

3,163,919
ROTARY CUTTING TOOLS
William Turner, Woodsetts, England, assignor to The Sheffield Twist Drill & Steel Company Limited, Sheffield, England, a company of Great Britain and Northern Ireland
Filed Apr. 2, 1963, Ser. No. 270,049
Claims priority, application Great Britain, Apr. 17, 1962, 14,836/62
5 Claims. (Cl. 29—105)

This invention relates to rotary cutting tools and particularly to face milling cutters of the kind having inserted cutting blades or "cutter bits" as they will hereinafter be referred to. Such cutter bits may be so-called throw-away bits each having a number of cutting edges which may be utilised successively until they are all blunt and require to be re-sharpened. Alternatively, they may each have a single cutting edge and be capable of being secured in the body of the cutter in only one position.

Cutting tools of the kind referred to may be capable of taking a substantial depth of cut from a workpiece. The resultant surface finish will not generally be of a very high order, however, and in practice it is usual, when a substantial amount of material is to be removed from a workpiece, to remove the greater proportion in one or more roughing cuts and to improve the surface finish by taking a finishing cut of very shallow depth and/or at a much reduced feed. However, if all the cutter bits are not secured in the body of the cutter so as to present the extremities of their cutting edges for operation in a common plane, the surface finish may still be rough and scored unless the feed is very slow indeed and the rate of production thus lowered. This may particularly be the case when the cutter is provided with throw-away bits.

The object of the present invention is to provide a face milling cutter which will produce a good surface finish on a workpiece while maintaining a high rate of production.

According to this invention, there is provided a face milling cutter of the kind before referred to in which one set of inserted cutter bits or tips constituting roughing bits are secured in the body of the cutter for operating at one common circumferential line and at least one other inserted cutter bit or tip is secured in said body for operating at another circumferential line which is of smaller diameter than and in axially advanced relation to that of said roughing bits or tips whereby said other inserted bit or tip constitutes a finishing bit or tip to effect a depth of cut which is sufficiently small as to produce a smooth finish to the surface of the workpiece.

The finishing bits or tips may be of similar form to the roughing bits or tips, and be removably secured in the body by means similar to or different from the means securing said roughing bits or tips, even though the angle at which they are disposed relative to the axis of the cutter may be different.

Preferably, however, all the inserted bits are retained in position by means according to co-pending application for Patent No. 253,121 of January 22, 1963, now Patent No. 3,142,111.

In order that the invention can be readily understood and more easily be put into effect, a preferred embodiment thereof will now be described, by way of example only, with reference to the accompanying drawings, of which:

FIG. 1 is a view on the face of a face milling cutter embodying the invention,

FIG. 2 is a side view thereof partly in section,

FIG. 3 is a sectional view on the line 3—3 in FIG. 2,

FIG. 4 is a sectional view on the line 4—4 in FIG. 1.

Referring now to the drawings, a face milling cutter has a body portion 10 which is provided with a series of circumferentially spaced cutter bits 12 arranged to operate at a common circumferential line. Said cutter bits are each of square configuration with rounded corners and are set on end in the body portion at such an angle that an operative cutting edge of each bit has an approach angle of approximately 45°.

The cutter bits 12 are accommodated in respective slots 14 which extend across a bevelled face 16 of the body portion, and opposing longitudinal side walls 18 and 20 of each slot converge towards the periphery of the body.

The longitudinal side walls 18 of the slots are provided with longitudinally extending serrations 22 and the narrow end of each slot is provided with an insert 24 having longitudinal serrations intermeshing with the serrations 22, said insert being fixedly secured in its slot so as to provide a locating face 26 for a cutter bit 12.

The cutter bits 12 are retained in their respective slots by means of retaining wedges 28 which are also provided with serrations for intermeshing engagement with the serrations 22 of the slots. The wedges are of such a length that they can be driven into the wider ends of the slots to clamp the cutter bits tightly in position without abutting against the locating faces 26 of the inserts 24.

The locating face 26 of each insert 24 co-operates with the basal wall 30 of its slot 14 in positioning a cutter bit 12 with the extremity of its cutting edge presented axially in advance of the body 10 and in a plane indicated in FIG. 2 by the chain dotted line 32. The side wall 20 of the slots 14 are disposed so as to position the cutter btis with the correct negative rake angles.

The body portion 10 is further provided with a pair of cutter bits 34, constituting finishing bits, which are identical to the cutter bits 12. Each of the cutter bits 34 is disposed, however, with an operative cutting edge 36 presented in a plane perpendicular to the axis of the body portion, and, as indicated by the chain dotted line 38 in FIG. 2, said plane is very slightly axially in advance of the plane containing the extremities of the cutting edges of the cutter bits 12. They are also arranged to operate at a smaller radius than the cutter bits 12.

The cutter bits 34 are accommodated in oppositely disposed slots 40 which extend across the face of the body portion 10 and, like the slots in which the cutter bits 12 are accommodated, their opposing longitudinal side walls 42 and 44 converge towards the periphery of the body. Similarly, their longitudinal side walls 42 are provided with longitudinally extending serrations 46 and the narrow end of each slot is provided with an insert 48 having longitudinal serrations intermeshing with the serrations 46, said insert being fixedly secured in its slot so as to provide a locating face 50 for a cutter bit 34.

The cutter bits 34 are retained in their slots in similar manner to the cutter bits 12, retaining wedges 52 being provided for insertion in the slots 40 and having serrated surfaces for intermeshing engagement with the serrations 46. The length of the wedges 52 is such that they can be driven into the wider ends of the slots 40, to clamp the cutter bits 34 tightly in position, without abutting against the locating faces 50.

The locating face 50 of each insert 48 co-operates with the basal wall 54 of its slot 40 in positioning a cutter bit 34 with its cutting edge presented for operation at a smaller radius than the extremities of the cutting edges of the cutter bits 12 but in axially advanced relation to said bits, as indicated by the chain dotted line 38 in FIG. 2.

As will be seen, the greater part of the body portion 10 is relieved, radially within the bevelled face 16, at an angle of approximately 90° to the latter. Diametrically opposed portions 56, across which the slots 40 extend, are not relieved, however, and provides more effective support for the cutter bits 34 than would otherwise be the case.

In operation, when the rotating milling cutter is traversed in a direction perpendicular to its axis, relative to a workpiece so that the cutter bits 12 take a substantial depth of cut therefrom, the cutter bits 34 simultaneously take a finishing cut of shallow depth so as to produce a better surface finish than would be produced by the bits 12 alone. The depth of cut which may be taken by the cutter bits 12 is, of course, limited to the length of their cutting edges measured axially of the tool and may, of course, be further reduced by limitations of the machine on which the operation is performed or by the strength of the workpiece. The depth of cut which will be taken by the cutter bits 34, however, will generally be only a few thousandths of an inch, sufficient to "clean up" the rough surface left by the cutter bits 12, and may vary according to the material being worked upon. The distance by which the cutter bits 34 lag behind the cutter bits 12, in other words the amount by which the radius at which the bits 34 operate is smaller than the radius at which the bits 12 operate, is not important and may be any convenient distance.

All the cutter bits employed are negative rake cutters, and since the cutter blades are of the reversible type and square in outline, each blade has a total of eight available cutting edges which can be used in turn.

It is to be understood, however, that the cutter bits may be of circular or any suitable polygonal form and that in the case of a circular cutter bit the locating face therefor on the insert may be suitably rounded.

It will also be understood that if the cutter blades are specially formed, in other words are not of the reversible type, the slots in the body of the cutter may be disposed so as to present the cutter bits at a positive or neutral rake angle.

It will, of course, be understood that various other modifications may be made without departing from the scope of the following claims. The blades may, if preferred, be formed integrally with the body of the cutter.

Milling cutters embodying the invention may be mounted for operation in any convenient manner, being adapted for arbor mounting or for direct spindle mounting.

What I claim is:

1. In a face milling cutter, a body portion having a first set of tapered slots equally spaced around its circumference and a second set of tapered slots also equally spaced around its circumference, each slot of said second set being disposed between two adjacent slots of said first set, serrations extending along one side wall of each slot, inserts fixedly secured in the narrower ends of the slots to provide locating faces therein, a first set of cutter bits accommodated in said first set of slots and abutting against the locating faces therein for operating at a common circumferential line, a second set of cutter bits accommodated in said second set of slots and abutting against the locating faces therein for operating at another circumferential line which is of smaller diameter than and in axially advanced relation to that of said first set of cutter bits, and serrated wedges for retaining the cutter bits in their respective slots.

2. In a face milling cutter, a body portion having a first set of tapered slots equally spaced around and extending across a bevelled peripheral surface and a second set of tapered slots comprising a pair of diametrically opposite tapered slots extending at right angles to the axis of said body portion, each of said pair of tapered slots being disposed between two adjacent slots of said first set of slots, serrations extending along one side wall of each slot, inserts fixedly secured in the narrower ends of the slots to provide locating faces therein, a first set of cutter bits of square configuration accommodated in said first set of slots and abutting against the locating faces therein for operating at a common circumferential line with an approach angle parallel to the angle of the bevelled peripheral surface of the body portion, a second set of cutter bits comprising oppositely disposed cutter bits accommodated in said second set of slots and abutting against the locating faces therein for operating at another circumferential line which is of smaller diameter than that of said first set of cutter bits and which is in axially advanced relation to the extremities thereof, and serrated wedges for retaining the cutter bits in their respective slots.

3. In a face milling cutter, a body portion having a first set of tapered slots equally spaced around and extending across a bevelled peripheral surface and a second set of tapered slots comprising a pair of diametrically opposite tapered slots extending at right angles to the axis of said body portion, each of said pair of tapered slots being disposed between two adjacent slots of said first set of tapered slots and the body portion being relieved, radially within the bevelled peripheral surface thereof, except for portions thereof through which the second set of tapered slots extend, serrations extending along one side wall of each slot, inserts fixedly secured in the narrower ends of the slots to provide locating faces therein, a first set of cutter bits of square configuration accommodated in said first set of slots and abutting against the locating faces therein for operating at a common circumferential line with an approach angle parallel to the angle of the bevelled peripheral surface of the body portion, a second set of cutter bits comprising oppositely disposed cutter bits accommodated in said second set of slots and abutting against the locating faces therein for operating at another circumferential line which is of smaller diameter than that of said first set of cutter bits and which is in axially advanced relation to the extremities thereof, and serrated wedges for retaining the cutter bits in their respective slots.

4. A face milling cutter comprising a body portion having a first set of slots spaced around its circumference and having bases extending in one direction relative to the axis of the cutter, and at least one other slot disposed between adjacent slots of said first set but having a base extending in a second direction, different from one said direction, relative to said axis, a plurality of reversible cutter bits constituting roughing bits accommodated in said first set of slots in seating engagement with the bases thereof for operating at a common circumferential line, and at least one other reversible cutter bit, constituting a finishing bit identical to the roughing bits and interchangeable therewith, accommodated in said other slot in seating engagement with the base thereof for operating at another circumferential line which is of smaller diameter than, and in axially advanced relation to, that of said roughing bits, whereby the degree of advance of said finishing bit in said second direction and the degree of advance of the roughing bits in said one direction can be adjusted while maintaining all the cutter bits in seating engagement with the bases of their respective slots.

5. In a face milling cutter, a body portion having a first set of tapered slots equally spaced around its circumference and having bases extending in one direction relative to the axis of the cutter, and a second set of tapered slots also equally spaced around its circumference, each slot of said second set extending in a second direction different from said one direction, relative to the axis of the cutter, and being disposed between two adjacent slots of said first set, a first set of roughing cutter bits accommodated in said first set of slots in seating engagement with the bases thereof for operating at a common circumferential line, a second set of finishing cutter bits accommodated in said second set of slots in seating engagement with the bases thereof for operating at another circumferential line which is of smaller diameter than, and in axially advanced relation to, that of said first set of cutter bits, and inserts secured in the narrower ends of the slots to provide locating faces therein for the cutter bits whereby the degree of advance of the finishing bits in said second direction and the degree of advance of the roughing bits or tips in said one direction can be adjusted by adjusting the positions of said inserts while maintaining all the cutter bits in seating engagement with the bases of their slots and with the locating faces therein.

References Cited by the Examiner
UNITED STATES PATENTS

| | | |
|---|---|---|
| 404,940 | 6/89 | Whitney. |
| 1,460,029 | 6/23 | Mattson. |
| 1,460,030 | 6/23 | Mattson _____ 29—105 |
| 1,951,101 | 3/34 | Miller. |
| 2,037,642 | 4/36 | Scribner _____ 29—96 X |
| 2,264,299 | 12/41 | Crosby _____ 29—105 |

WILLIAM W. DYER, Jr., *Primary Examiner.*